United States Patent
Von Deylen

(10) Patent No.: US 12,152,400 B2
(45) Date of Patent: Nov. 26, 2024

(54) EXPANDING FOUNDATION SYSTEM AND METHOD

(71) Applicant: APA SOLAR, LLC, Ridgeville Corners, OH (US)

(72) Inventor: Joshua David Von Deylen, Bryan, OH (US)

(73) Assignee: APA SOLAR, LLC, Ridgeville Corners, OH (US)

( * ) Notice: Subject to any disclaimer, the term of this patent is extended or adjusted under 35 U.S.C. 154(b) by 157 days.

(21) Appl. No.: 17/959,643

(22) Filed: Oct. 4, 2022

(65) Prior Publication Data
US 2023/0106901 A1    Apr. 6, 2023

Related U.S. Application Data

(60) Provisional application No. 63/251,829, filed on Oct. 4, 2021.

(51) Int. Cl.
| | | |
|---|---|---|
| *E04H 12/22* | (2006.01) | |
| *E02D 5/80* | (2006.01) | |
| *E02D 27/50* | (2006.01) | |
| *E04H 12/34* | (2006.01) | |
| *E02D 7/02* | (2006.01) | |

(52) U.S. Cl.
CPC ........... *E04H 12/347* (2013.01); *E02D 5/803* (2013.01); *E02D 27/50* (2013.01); *E04H 12/22* (2013.01); *E02D 7/02* (2013.01); *E02D 2250/0023* (2013.01); *E02D 2600/30* (2013.01)

(58) Field of Classification Search
CPC ....... E04H 12/347; E04H 12/22; E02D 5/803; E02D 5/56; E02D 27/50; E02D 7/22; E02D 7/28; E02D 7/30

USPC ............................................. 405/259.4–259.6
See application file for complete search history.

(56) References Cited

U.S. PATENT DOCUMENTS

| | | | | |
|---|---|---|---|---|
| 787,017 | A * | 4/1905 | Witmer | |
| 4,015,433 | A * | 4/1977 | Shibata | E02D 5/54 405/259.5 |
| 4,023,314 | A * | 5/1977 | Tanner | E04B 1/34347 52/162 |
| 4,708,530 | A * | 11/1987 | Faber | E02D 7/22 405/253 |
| 4,826,373 | A * | 5/1989 | Nakano | E04G 23/0211 405/269 |
| 5,275,512 | A * | 1/1994 | Wright | E21D 21/008 405/259.4 |
| 2021/0249986 | A1 | 8/2021 | Von Deylen | |

FOREIGN PATENT DOCUMENTS

| | | | |
|---|---|---|---|
| GB | 215623 | * | 5/1924 |
| WO | WO 2013/113652 A1 | * | 8/2013 |

* cited by examiner

*Primary Examiner* — Sunil Singh
(74) *Attorney, Agent, or Firm* — Jacob M. Ward; Ward Law Office LLC

(57) ABSTRACT

A foundation system for supporting a structure may include a main post, a racking post, and a barb assembly. The main post may include an upper section and a lower section below the upper section. The racking post may be telescopically connected to the upper section of the main post. The barb assembly may be connected to the lower section of the main post. The barb assembly may be configured to move from an unexpanded state to an expanded state, thereby forming a wedge shape at a lower section of the main post.

13 Claims, 13 Drawing Sheets

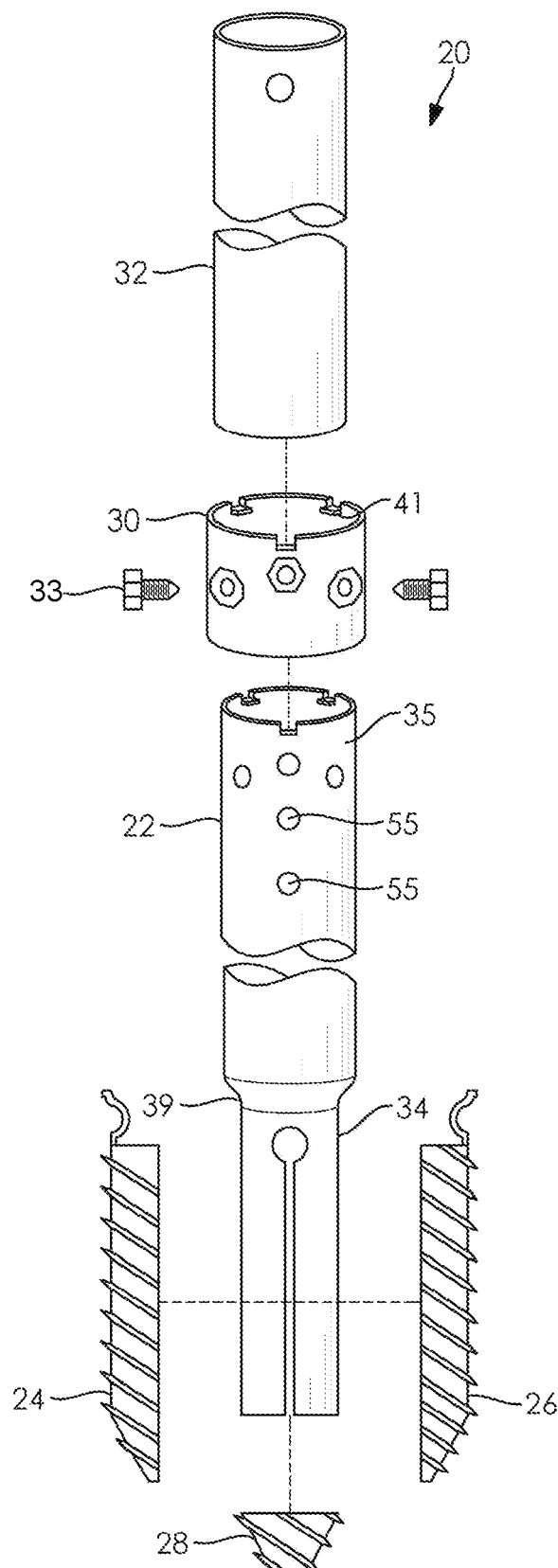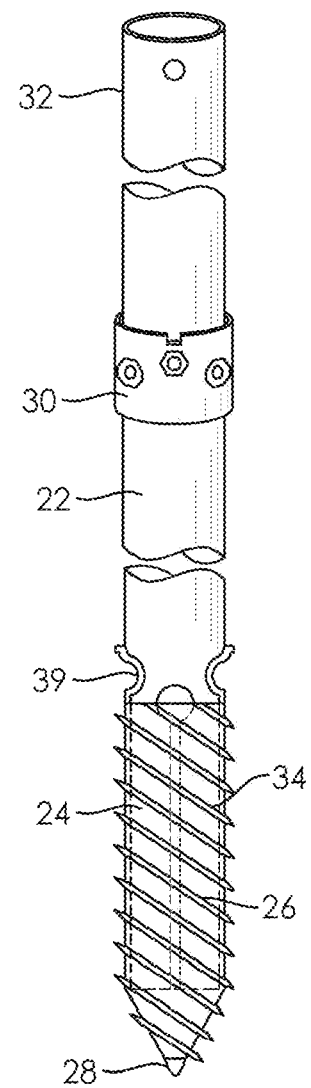
FIG. 1
FIG. 2

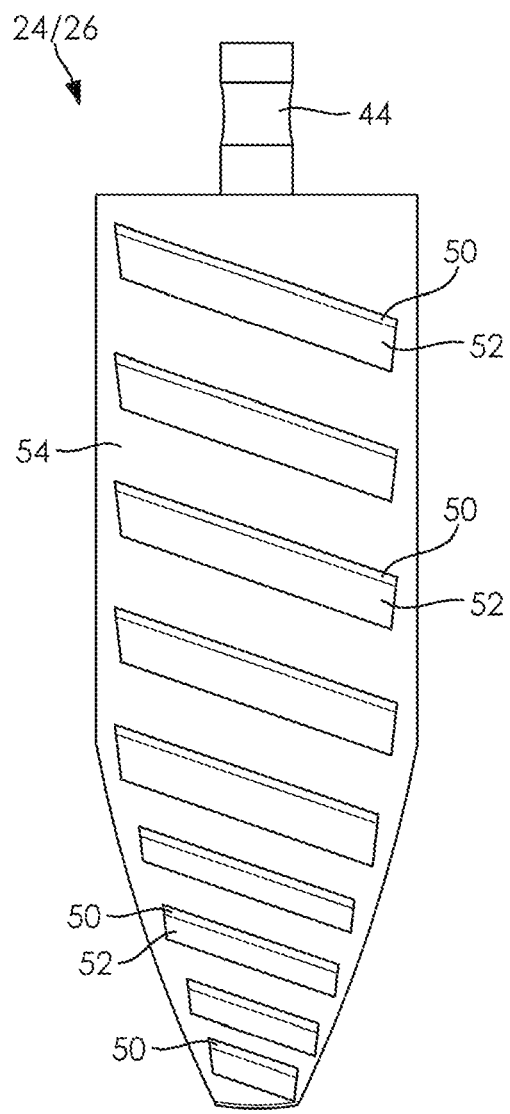
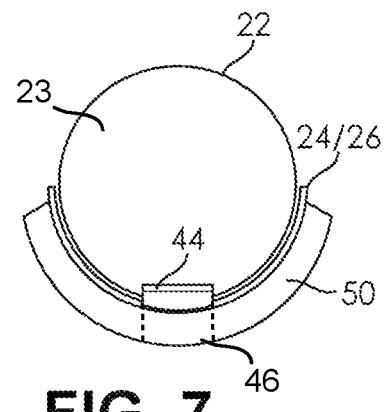
FIG. 6
FIG. 7

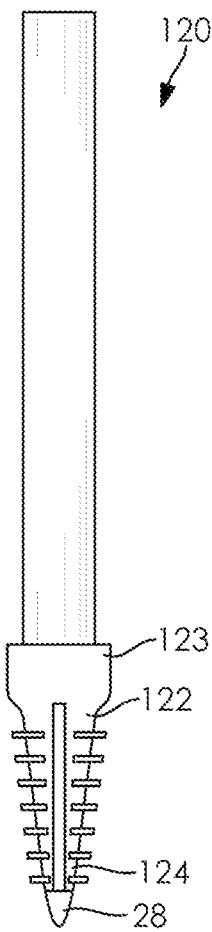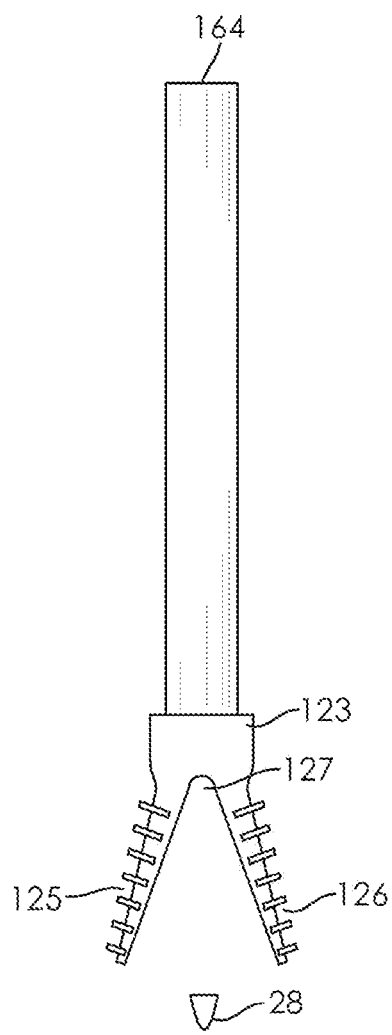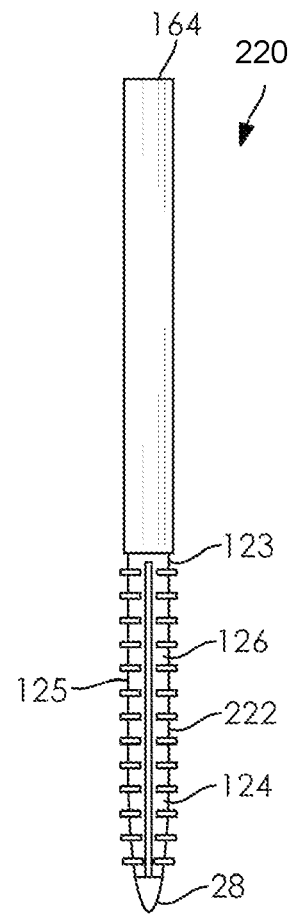
FIG. 10
FIG. 11
FIG. 12

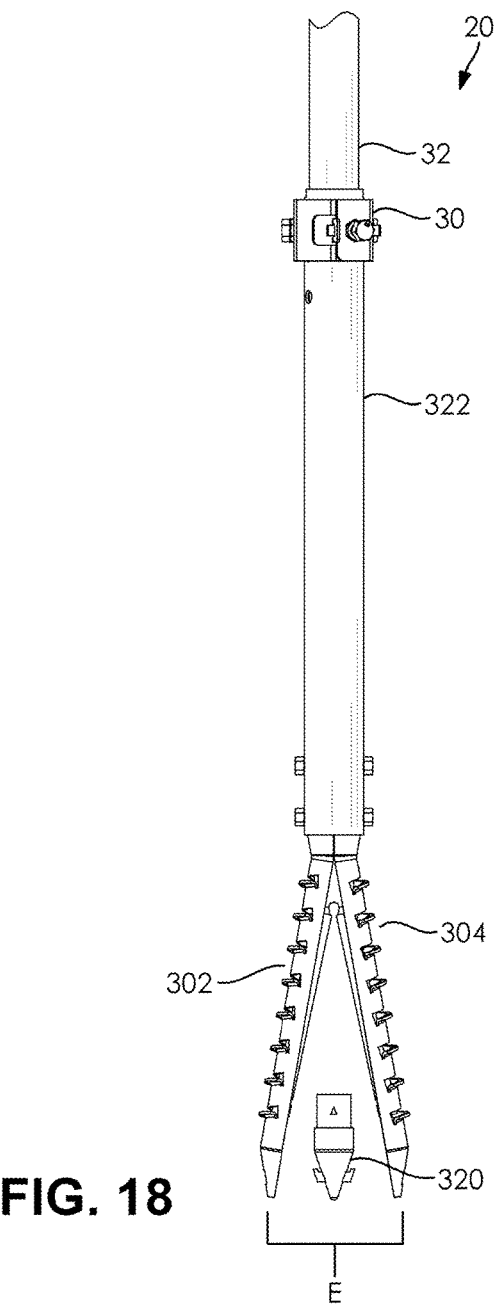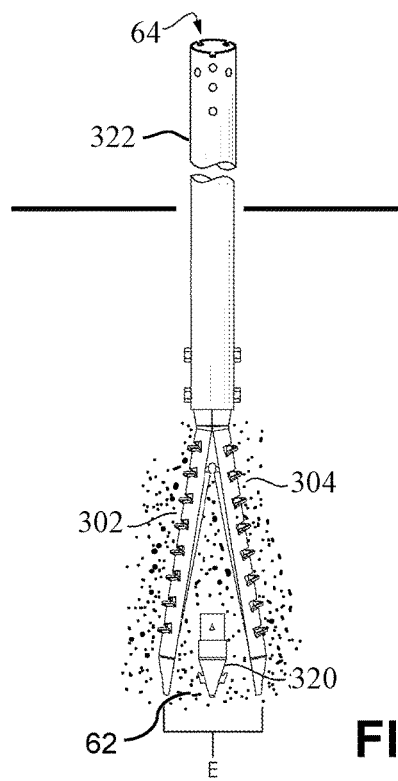
FIG. 18
FIG. 19

EXPANDING FOUNDATION SYSTEM AND METHOD

CROSS-REFERENCE TO RELATED APPLICATIONS

This application claims the benefit of U.S. Provisional Application No. 63/251,829, filed on Oct. 4, 2021. The entire disclosure of the above application is incorporated herein by reference.

FIELD

The present disclosure relates to racking systems, and more particularly to an expanding foundation for supporting a solar racking system.

BACKGROUND

The statements in this section merely provide background information related to the present disclosure and may not constitute prior art.

Renewable energy, such as solar energy, is a fast-growing energy source, especially with the rising cost of non-renewable energy sources. One method of harnessing solar energy is by installing an array of solar panels to buildings or the ground. Ground mounted solar arrays may be attached to a racking system secured to a foundation pile, such as a helical pile or ground screw pile, which penetrates the ground surface to stabilize and support the structure.

A pile foundation may be defined as a column or series of columns constructed or inserted into the ground to transmit loads to a lower level of subsoil. A pile may be a long cylinder made up of a strong material, such as concrete. Piles are pushed into the ground to act as a steady support for structures built on top of them. Piles may transfer a load from a structure such as solar array to hard strata, rocks, or soil with high bearing capacity. A pile may support the structure by remaining solidly placed in the soil. As pile foundations are set in the soil, they are more tolerant to erosion and scour.

The foundation pile may also absorb compressive and tensile forces created by the weight of the structure, wind load, and snow, among other loads. As such, the type of foundation pile employed is influenced by soil composition, climate conditions, module size, and array tilt, among other features. It is important that the pile foundation is stable so that the foundation may absorb the compressive and tensile forces of the structure. In addition, it may be desirable for the foundation to be easy to install and have a low installation torque.

Accordingly, there is a continuing need for a foundation system that absorbs greater compressive and tensile forces, is stable, is cost effective, is easy to install, and that has a low installation torque.

SUMMARY

In concordance with the present disclosure, a foundation system that absorbs greater compressive and tensile forces, is stable, is cost effective, is easy to install, and that has a low installation torque, is surprisingly discovered.

In certain embodiments, a foundation for supporting a structure may include a foundation pile having an upper section and a lower section. The lower section may include a notch. A first leg and a second leg of the lower section may be separated by the notch. A first leg bit may be connected to the first leg and a second leg bit may be connected to the second leg. In certain embodiments, a tip may be configured to hold the first leg bit and the second leg bit together, when the first leg and the second leg are in an unexpanded state. The foundation may further include an attachment ring disposed around the upper section for securing a post within the top section of the foundation pile. The first leg bit and the second leg bit may include threading.

In certain embodiments, a foundation pile for supporting a structure may include an upper section and a lower section. The lower section may include a first leg and a second leg separated by a notch. The lower section may be configured to move from an unexpanded state to an expanded state, thereby forming a wedge. The first leg may include a first leg bit and the second leg may include a second leg bit. A tip of the foundation pile may be configured to hold the first leg bit and the second leg bit together, when the first leg and the second leg are in an unexpanded state.

When the lower section is in the unexpanded state, an outer dimension of the lower section is smaller than an outer dimension of the upper section and the tip is connected to the first leg bit and the second leg bit. When the lower section is in the expanded state, the first leg and the second leg may be expanded such that the outer dimension of the lower section is greater than the outer dimension of the upper section and the tip is detached from the first leg bit and the second leg bit.

In operation, a predetermined amount of expanding substrate may be poured into a hole located at the upper section of the foundation pile. When the expanding substrate cures, the lower section of the foundation pile is caused to move from the unexpanded state to the expanded state, thereby forming a wedge, in which an outer dimension of the lower section is greater than an outer dimension of the upper section.

In certain embodiments, a foundation system for supporting a structure may include a main post, a racking post, and a barb assembly. The main post may include an upper section and a lower section below the upper section. The racking post may be telescopically connected to the main post upper section. The barb assembly may be connected to the lower section of the main post. The barb assembly may be configured to move from an unexpanded state to an expanded state, thereby forming a wedge shape at the lower section of the main post.

The barb assembly may include a first outer barb, a second outer barb, a split tube, and a cap. The split tube may be configured to receive the cap at a first end of the split tube. In certain embodiments, the cap may be retained by a cap detent secured within a detent hole of the split tube. The first outer barb and the second outer barb may cover the cap and the split tube in an assembled configuration of the barb assembly. In certain embodiments, the first outer barb and the second outer barb are secured over the cap and the split tube with a cap clip fit within a cap clip hole of one or both of the first outer barb and the second outer barb. The barb assembly may be connected to the lower section of the main post using one or more fasteners, such as one or more nuts secured to a threaded outer bar bolt of one or both of the first outer barb and the second outer barb.

The split tube may include a split tube notch and a split tube hinge point for facilitating movement of the barb assembly from the unexpanded state to the expanded state. The cap may be configured to detach from the split tube when the barb assembly moves from the unexpanded state to the expanded state. In certain embodiments, each of the first outer barb and the second outer barb include a plurality of threads. The main post may include a hole configured to accept an expanding substrate. In certain embodiments, the foundation system for supporting a structure includes an attachment ring for securing the racking post to the upper section of the main post.

The attachment ring may include a top end, a bottom end, and a fastener (e.g., a nut) having a center aperture configured to align with a hole of the upper section of the main post. The attachment ring may further include one or more clocking features. The clocking features may be configured to rotationally align a fastener of the attachment ring to a hole of the main post. In certain embodiments, the clocking features include notches, wherein each notch includes an inwardly extending protrusion having a lower face and one or more sidewalls. The main post may include a recess configured to receive a notch of the attachment ring.

In certain embodiments, a method for installing a pile for supporting a structure may include driving a pile into a pre-drilled hole. The pile may include an upper section and a lower section. A predetermined amount of expanding substrate may be poured into a hole of the upper section of the pile. In certain embodiments, as the expanding substrate cures, the lower section moves from an unexpanded state to an expanded state thereby forming a wedge shape at the lower section. The method may further include placing a predetermined amount of aggregate into the hole before driving the pile into the hole. An attachment ring may be attached to an upper section of the pile. In certain embodiments, a racking post may be inserted into the pile and set to a predetermined height. The racking post may be secured within the pile at the predetermined height.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 is an exploded side elevational view of a foundation pile and a foundation pile racking post according to an embodiment of the present disclosure;

FIG. 2 is a side elevational view of the foundation pile attached to the foundation pile racking post of FIG. 1;

FIG. 6 is a side elevational view of one of the first leg bit and the second leg bit, according to the present disclosure;

FIG. 7 is a top plan view of the foundation pile having one of the first leg bit and the second leg bit attached thereto, according to the present disclosure;

FIG. 10 is a side elevational view of a foundation pile according to another embodiment of the present disclosure;

FIG. 11 is a side elevational view of the foundation pile of FIG. 12 depicting the foundation pile in an expanded state;

FIG. 12 is a side elevational view of a foundation pile according to yet another embodiment of the present disclosure;

FIG. 18 is a front elevation view of an assembled foundation system in the expanded position with the cap detached, according to the present disclosure;

FIG. 19 is a front elevation view of the foundation system of FIG. 18 in the expanded position while the expanding material cures, according to the present disclosure.

DETAILED DESCRIPTION

Figure 3:
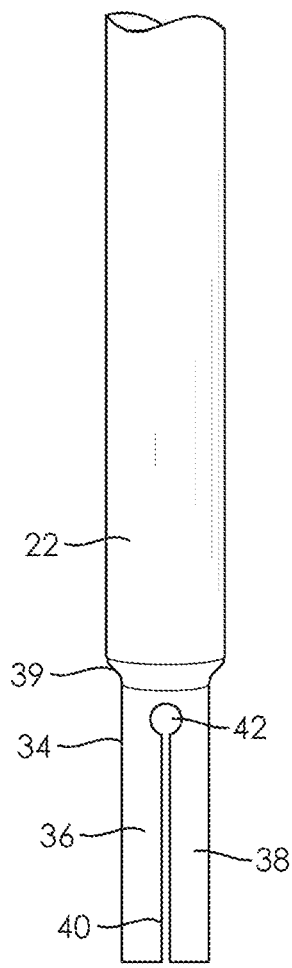
FIG. 3 is a side elevational view of the foundation pile, depicting a first leg and a second leg without a leg bit attached thereto, according to the present disclosure.

The following description of technology is merely exemplary in nature of the subject matter, manufacture, and use of one or more inventions, and is not intended to limit the scope, application, or uses of any specific invention claimed in this application or in such other applications as can be filed claiming priority to this application, or patents issuing therefrom. Regarding methods disclosed, the order of the steps presented is exemplary in nature, and thus, the order of the steps can be different in various embodiments, including where certain steps can be simultaneously performed.

The terms "a" and "an" as used herein indicate "at least one" of the item is present; a plurality of such items can be present, when possible. Except where otherwise expressly indicated, all numerical quantities in this description are to be understood as modified by the word "about" and all geometric and spatial descriptors are to be understood as modified by the word "substantially" in describing the broadest scope of the technology. The term "about" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that can arise from ordinary methods of measuring or using such parameters.

Although the open-ended term "comprising," as a synonym of non-restrictive terms such as including, containing, or having, is used herein to describe and claim embodiments of the present technology, embodiments can alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application.

Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter can define endpoints for a range of values that can be claimed for the parameter. For example, if Parameter X is exemplified herein to have value A and also exemplified to have value Z, it is envisioned that Parameter X can have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X can have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it can be directly on, engaged, connected, or coupled to the other element or layer, or intervening elements or layers can be present. In contrast, when an element is referred to as being "directly on," "directly engaged to," "directly connected to" or "directly coupled to" another element or layer, there can be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. can be used herein to describe various elements, components, regions, layers and/or sections, these elements, components, regions, layers and/or sections should not be limited by these terms. These terms can be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, can be used herein for ease of description to describe one element or feature's relationship to another element(s) or feature(s) as illustrated in the figures. Spatially relative terms can be intended to encompass different orientations of the device in use or operation in addition to the orientation depicted in the figures. For example, if the device in the figures is turned over, elements described as "below", or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

The present technology relates to an expanding foundation system. A foundation system for supporting a structure may include a main post, a racking post, and a barb assembly. The main post may include an upper section and a lower section below the upper section. The racking post may be telescopically connected to the main post upper section. The barb assembly may be connected to the main post lower section. The barb assembly may be configured to move from an unexpanded state to an expanded state, thereby forming a wedge shape at the main post lower section.

The barb assembly may include a first outer barb, a second outer barb, a split tube, and a cap. The split tube may be configured to receive the cap at a first end of the split tube. In certain embodiments, the cap may be retained by a cap detent secured within a detent hole of the split tube. The first outer barb and the second outer barb may cover the cap and the split tube in an assembled configuration of the barb assembly. In certain embodiments, the first outer barb and the second outer barb are secured over the cap and the split tube with a cap clip fit within a cap clip hole of one or both of the first outer barb and the second outer barb. The barb assembly may be coupled to the lower section of the main post in various ways, including by using one or more fasteners. In certain embodiments, the barb assembly may be coupled to the lower section of the main post using one or more threaded fasteners received through the main post and secured with an outer fastener. In certain embodiments, the fastener may include one or more of a nut, a bolt, a screw, and combinations thereof. In particular, the barb assembly may be coupled to the lower section of the main post using any appropriately desired mechanism. For example, in certain embodiments the barb assembly may couple to the lower section of the main post through a friction fit, by screwing into the lower section of the main post, and/or clipping into the lower section of the main post.

The split tube may include a split tube notch and a split tube hinge point for facilitating movement of the barb assembly from the unexpanded state to the expanded state. The cap may be configured to detach from the split tube when the barb assembly moves from the unexpanded state to the expanded state. In certain embodiments, each of the first outer barb and the second outer barb includes a plurality of threads. The main post may include a hole configured to accept an expanding substrate. In certain embodiments, the foundation system for supporting a structure includes an attachment ring for securing the racking post to the upper section of the main post.

The attachment ring may include a top end, a bottom end, and a fastener having a center aperture configured to align with a of hole of the upper section of the main post. In certain embodiments, the fastener may comprise a nut. The attachment ring may further include a clocking feature. The clocking feature may be configured to rotationally align the fastener of the attachment ring to a hole of the main post. In certain embodiments, the clocking feature may include a notch. The notch may include an inwardly extending protrusion having a lower face and one or more sidewalls. The main post may include a recess configured to receive a notch of the attachment ring. As would be understood by someone of ordinary skill in the art, the attachment ring may include any appropriately desired number of fasteners, holes, and clocking features for mating the attachment ring with the main post.

In certain embodiments, a method for installing a pile for supporting a structure may include driving a pile into a pre-drilled hole. The pile may include an upper section and a lower section. A predetermined amount of expanding substrate may be poured into a hole of the upper section of the pile. The hole may be configured as a conduit that traverses a length of the main post, allowing the expanding substrate to flow therethrough (e.g., by gravity, by force, by pumping, use of a plunger, etc.) and exit the distal end to then expand the barb assembly. As the expanding substrate cures, the lower section moves from an unexpanded state to an expanded state thereby forming a wedge shape at the lower section. The method may further include placing a predetermined amount of aggregate into the pre-drilled hole before driving the pile into the hole. An attachment ring may be attached to an upper section of the pile. In certain embodiments, a racking post may be inserted into the pile and set to a predetermined height. The racking post may be secured within the pile at the predetermined height.

EXAMPLES

Example embodiments of the present technology are provided with reference to the several figures enclosed herewith.

A foundation system 20 for supporting a structure, such as a racking system is shown in FIGS. 1 and 2. The foundation system 20 may include a cylindrical foundation pile 22, a first leg bit 24 and a second leg bit 26 disposed around a lower section 34 of the foundation pile 22. A tip 28 may be configured to be shared by the first leg bit 24 and the second leg bit 26. An attachment ring 30 may be disposed around an upper section 35 of the foundation pile 22. A racking post 32 may be axially movable within the foundation pile 22 to form a telescoping connection within the foundation pile 22.

Figure 5:
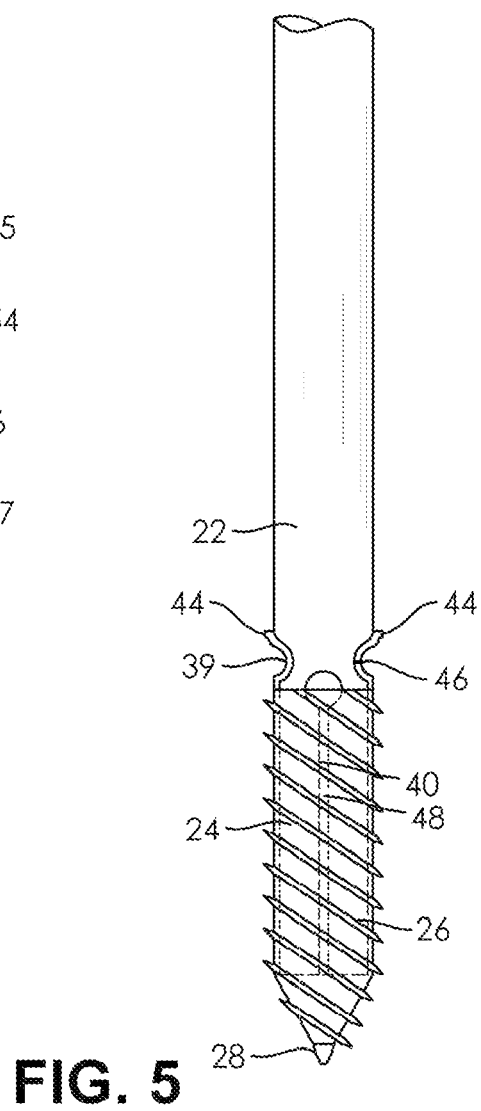
FIG. 5 is a side elevational view of the first leg bit and the second leg bit attached to the foundation pile with the shared tip attached thereto, according to the present disclosure.

As shown in FIG. 3, the foundation pile 22 may include a swedged area 39 in which a diameter of the lower section 34 is reduced. In certain embodiments, a diameter of the foundation pile 22 may be reduced in the swedged area 39. For example, a diameter of the foundation pile 22 may be reduced from 2.75 inches to 2.2 inches. The lower section 34 of the foundation pile 22 may include a first leg 36 and a second leg 38 separated by a notch 40. The notch 40 may have a hinge point 42, where the hinge point 42 can be configured as a cutout at an end of the notch 40 closer to the swedged area 39. The notch 40 may enable the first leg 36 and the second leg 38 of the foundation pile 22 to move from an unexpanded state as shown in FIG. 5 to an expanded state as shown in FIG. 8D. A movement of the lower section 34 of the foundation pile to the expanded state may be facilitated by the swedged area 39 and the hinge point 42 of the notch 40.

Figure 4:
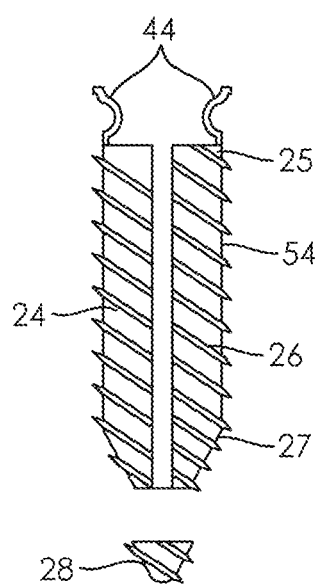
FIG. 4 is a side elevational view of first leg bit and a second leg bit, and a tip shared by the first leg bit and the second leg bit, according to the present disclosure.

As further shown in FIGS. 4-5, each one of the first bit 24 and the second bit 26 may include a top section 25, a bottom section 27, an attachment device 44 extending from the top section 25, and a plurality of threads 50 between the top section 25 and the bottom section 27. The first leg bit 24 and the second leg bit 26 may be configured to be attached to the first leg 36 and the second leg 38 through the attachment device 44. The attachment device 44 of the first leg bit 24 and the second leg bit 26 may be configured for interlocking with a preformed hole 46 located on each one of the first leg 36 and the second leg 38 of the foundation pile 22. For example, the attachment device 44 of the first leg bit 24 and the second leg bit 26 may be configured to interlock with the preformed hole 46 through a friction fit, a snap fit or other appropriately desired mechanism. In certain embodiments, the attachment device 44 interlocks with the preformed hole 26 such that the attachment device 44 fits through the preformed hole 26 and into an interior 23 of the foundation pile, such as shown in FIG. 7. When the first leg bit 24 and the second leg bit 26 are interlocked into the first leg 36 and the second leg 38, a seam 48 may be formed between the first leg bit 24 and the second leg bit 26. The seam 48 may be aligned with the notch 40 formed between the first leg 36 and the second leg 38 of the foundation pile 22. The first leg bit 24 and the second leg bit 26 may be separate components. The first leg bit 24 and the second leg bit 26 may include galvanized steel. In certain embodiments, the first leg bit 24 and the second leg bit 26 may be formed by a stamping process.

As shown in FIG. 6, the first leg bit 24 and the second leg bit 26 may include a plurality of threads 50. FIG. 6 shows a side view of one of the first leg 24 and the second leg 26, while FIG. 7 shows a top view of one of the first leg bit 24 and the second leg bit 26 attached to the foundation pile 22. When the first leg bit 24 and the second leg bit 26 are formed by stamping, for example, diagonal slits 52 may be formed such that the metal is left attached along the top side of each diagonal slit 52. The metal may be bent outward along the top side of each diagonal slit 52 thereby forming each thread. In certain embodiments, the plurality of threads 50 may be formed at an angle between about 45° and about 90° relative to an outer surface 54 of the first leg bit 24 and the second leg bit 26. In certain embodiments, the plurality of threads 50 may be formed at an angle between about 35° and about 90° relative to the outer surface 54 of the first leg bit 24 and the second leg bit 26. The plurality of threads 50 may be configured to facilitate penetration of the foundation pile 22 when the foundation pile 22 is being driven into the ground.

After the first leg bit 24 and the second leg bit 26 are locked into position, a tip 28 may be detachably coupled to the first leg bit 24 and the second leg bit 26 such that the tip 28 may be released or detached from the first leg bit 24 and the second leg bit 26 when expansion activity occurs. The tip 28 may be shared by the first leg bit 24 and the second leg bit 26, such that the tip 28 may be configured to hold the first leg bit 24 and the second leg bit 26 together and in place until an expansion event. The tip 28 may define a point shape configured to grind through aggregate disposed in a pilot hole. In certain embodiments, the tip 28 may include a plastic polymer.

In certain embodiments, such as shown in FIGS. 8A-8D, to install the foundation pile 22 within the ground, a hole 56 may be drilled at a predetermined depth into a ground 58 where the foundation pile 22 is to be installed. The hole 56 may generally define a diameter that is smaller than the diameter of the foundation pile 22 being installed. The hole 56 may reducing the torque necessary to install the foundation pile into the hole 56. A predetermined amount of aggregate 60 may be placed into the hole 56. The aggregate 60 may include any material suitable for providing increased pile strength. For example, the aggregate 60 may include one or more of sand, gravel, crushed stone, slag, recycled concrete, and geosynthetic materials, among others. In certain embodiments, the aggregate 60 may include pea gravel that is placed in the bottom of the hole 56. In certain embodiments, the foundation pile 22 may be installed by hand or with a machine operated rotator having an adaptor (not shown) attached to the foundation pile 22 through the attachment holes 55 located at the upper section 35 of the foundation pile 22.

Figures 8A, 8B, 8C:
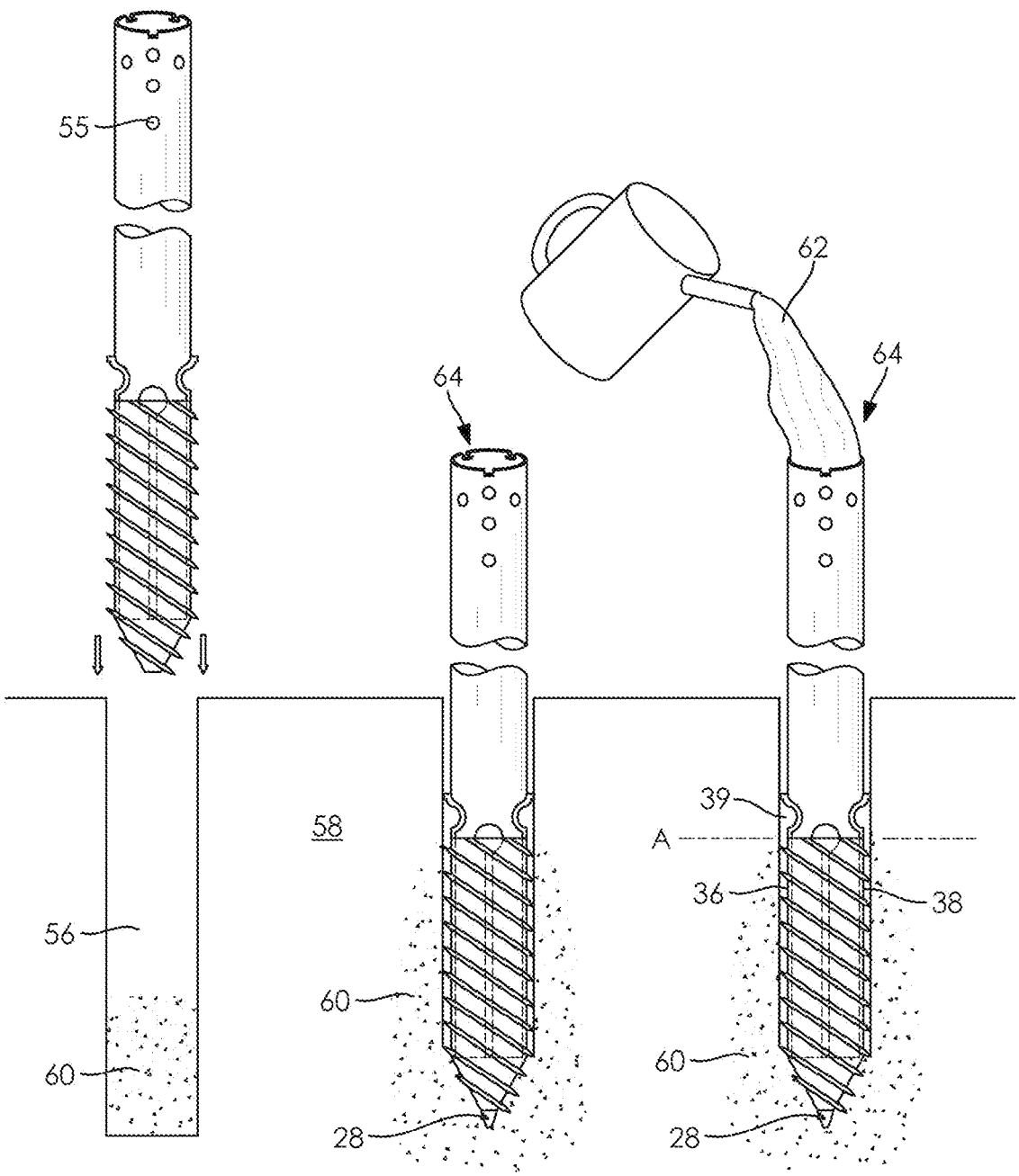
FIGS. 8A-8D show various stages of installing the foundation pile depicting a volume of expanding material being poured into an opening of the foundation pile and expansion of the foundation pile while the expanding material cures, according to the present disclosure.
Figure 8D:
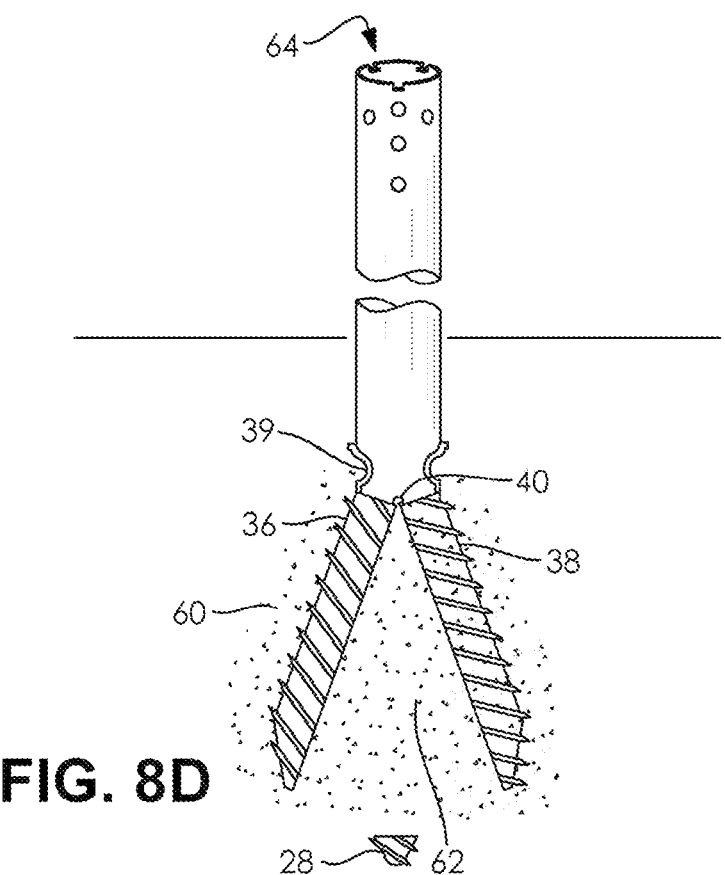

As shown in FIG. 8B, the hole 56 may reduce the torque necessary to install the foundation pile 22 into the hole 56. The plurality of threads 50 on the first leg bit 24, the second leg bit 26, and the tip 28 may facilitate penetration of the foundation pile 22 into the hole 56. A pointed shape of the tip 28 may facilitate grinding through the aggregate 60 and further inhibit the aggregate 60 from entering a bottom of the foundation pile 22.

As shown in FIG. 8C, when the foundation pile 22 is installed at a predetermined depth, a predetermined amount of an expanding substrate 62 may be poured into a hole 64 formed at the top of the foundation pile 22. The hole 64 may be configured as a conduit that traverses a length of the foundation pile 22, allowing the expanding substrate to flow therethrough (e.g., by gravity, by force, by pumping, use of a plunger, etc.) and exit a distal end where the tip 28 is located to then expand the first leg 36 and the second leg 38. The expanding substrate 62 may include various materials, such as concrete, mortar, a polymeric material, and expanding foam. In particular, the expanding substrate 62 may include any appropriately desired expanding substrate 62, as known in the art. In certain embodiments, the type of expanding substrate 62 employed may be influenced by the structure being supported by the foundation system 20. For example, in certain embodiments, the expanding substrate 62 may include one or more of a concrete with a compressive strength of 20,000 psi, a polymeric material with a compressive strength between 6 and 8 psi, and an expanding foam with a compressive strength between 15 and 25 psi, as desired. In certain embodiments, the foundation pile 22 may be filled with the expanding substrate 62 to fill line A. For example, the expanding substrate 62 may fill the space between the first leg 36 and the and second leg 38 of the lower section 34 of the foundation pile 22. As shown in FIG. 8C, the first leg 36 and the second leg 38 are in the unexpanded position.

As shown FIG. 8D, the first leg 36 and the second leg 38 have moved from the unexpanded state as shown in FIG. 8C to an expanded state. In certain embodiments, as the expanding substrate 62 cures, it expands, which pushes the first leg 36 and the second leg 38 in a direction away from each other, thereby forming a wedge shape with the expanding substrate 62 in between the first leg 36 and the second leg 38. As the substrate 62 cures, the interlocked first leg bit 24 and the interlocked second leg bit 26 move with the first leg 36 and the second leg 38, thereby causing the tip 28 to detach. As shown in FIG. 8D, when the first leg 36 and the second leg 38 are in the expanded state, the outer dimension of the lower section 34 of the foundation pile 22 is now greater than the outer dimension of the upper section 35 thereby forming a wedge. The wedge may strengthen the structural integrity of the foundation system 20 and provide a foundation pile 22 that may absorb greater compressive and tensile forces.

Figure 9:
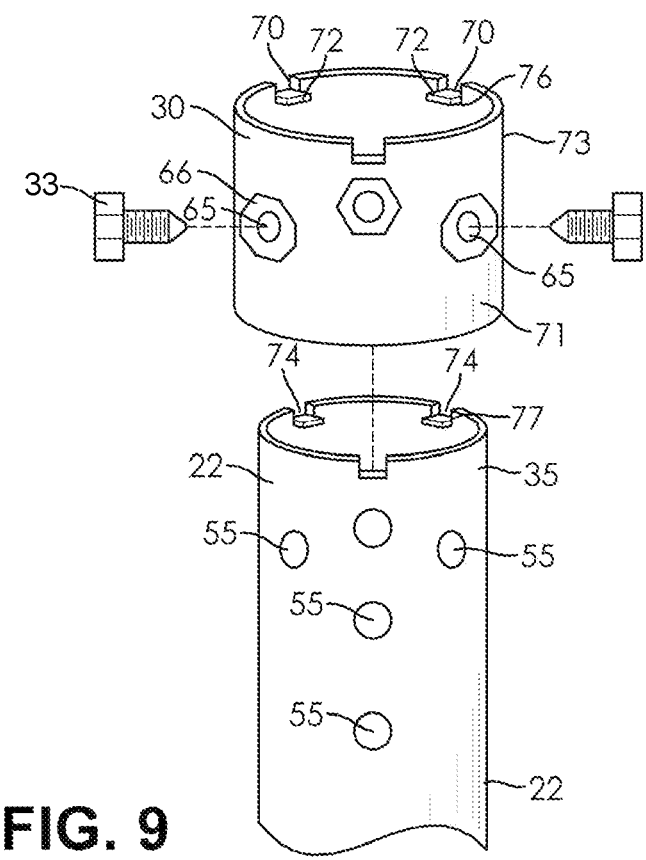
FIG. 9 is an exploded side elevational view of an attachment ring and a top section of the foundation pile of FIG. 1.
Figure 13:
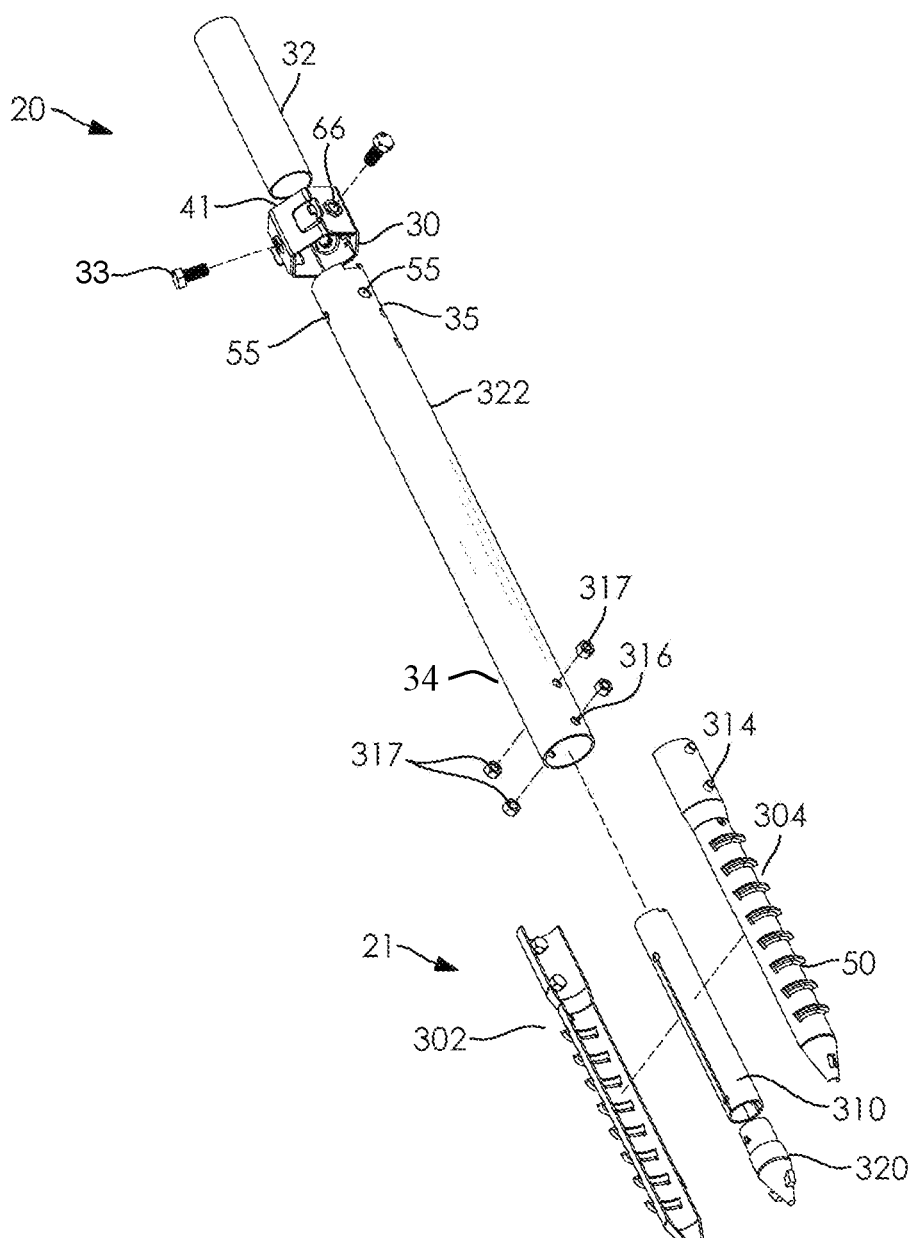
FIG. 13 is an exploded side perspective view of a foundation system and a foundation pile racking post according to a still further embodiment of the present disclosure.

Once the foundation pile 22 is installed into the ground, an attachment ring 30, such as shown in FIG. 9 for securing the racking post 32 to the foundation pile 22 may be attached to the upper section 35 of the foundation pile 22. The attachment ring 30 defines a diameter greater than a diameter of the foundation pile 22 to permit sliding the attachment ring 30 onto the upper section 35 of the foundation pile 22 such that the attachment ring 30 is disposed around the upper section 35 of the foundation pile 22.

The attachment ring 30 may include a top end 73, a bottom end 71, a plurality of nuts 66 having a center orifice aligned with a plurality of holes 65. The plurality of nuts 66 may be attached to the attachment ring 30 by any appropriately desired means as known in the art. In certain embodiments, the plurality of nuts 66 may be welded to an outer surface of the attachment ring 30 at a location permitting the alignment of a center orifice of the plurality of nuts 66 with the plurality of holes 65, thereby forming a plurality of through holes. The plurality of nuts 66 may be threaded. In certain embodiments, the attachment ring 30 may include three holes 65 and three corresponding nuts 66, thereby forming three through holes. However, it should be appreciated that one skilled in the art may employ any number of holes and nuts, as desired.

Typically, the nuts 66 may be welded to the foundation pile 22 and then the foundation pile 22 may be hot dip galvanized, thereby creating an additional step of cleaning out the threading of the nuts afterwards, which is costly and time consuming. Advantageously, as shown in FIG. 9, having the plurality of nuts 66 disposed on the attachment ring 30 as opposed to the foundation pile 22, is more cost effective and efficient.

The attachment ring 30 may further include one or more clocking features to rotationally align the plurality of through holes 65 of the attachment ring 30 to a plurality of holes 55 of the foundation pile 22. In certain embodiments, as shown in FIG. 9, the clocking features of the attachment ring 30 may include a notch 70 formed at the top end 73. In certain embodiments, each notch 70 may include an inwardly extending protrusion 72 having a lower face 76 and sidewalls. The foundation pile 22 may include a plurality of recesses 74 formed at a top end of the upper section 35 of the foundation pile 22. Each recess 74 may include an upper face 77 and sidewalls. Each recess 74 may be configured to receive the protrusion 72 of one of the notches 70.

In operation, the user may slide the attachment ring 30 onto the foundation pile 22 while clocking the plurality of notches 70 of the attachment ring 30 and the plurality of recesses 74 of the foundation pile 22 together such that each protrusion 72 may be in mating contact with a corresponding recess 74. More specifically, the lower face 76 of each protrusion 72 may engage with an upper face 77 of the corresponding recess 74 to hold the attachment ring 30 in place and inhibit the attachment ring 30 from rotating about the foundation pile 22 or moving further down the foundation pile 22.

Once proper placement of the attachment ring 30 on the foundation pile 22 is achieved, the attachment ring 30 may be disposed around the upper section 35 of the foundation pile 22, the plurality of nuts 66 and holes 65 of the attachment ring 30 are circumferentially aligned with plurality of holes 55 of the foundation pile 22.

Next, the upper racking post 32 may be inserted into the opening 41 at the top end of the foundation pile 22 to a predetermined height. A set screw 33 is then inserted and rotated through each of the plurality of nuts 66 to lock the upper racking post 32 into position in the foundation pile 22.

Referring to FIGS. 10-11, a single-piece foundation pile 120 according to another embodiment of the present disclosure is shown. Here, the single-piece foundation pile 120 does not include the first leg 36 and the second leg 38. Instead, the single-piece foundation pile 120 may have the same diameter throughout and a screw cap 122 may be attached to the bottom of the single-piece foundation pile 120. The screw cap 122 may include a top section 123 having a diameter greater than the single-piece foundation pile 120 and a threaded section 124 having a diameter smaller than single-piece foundation pile 120. In certain embodiments, the screw cap 122 may be welded to the single-piece foundation pile 120.

The threaded section 124 may be defined by a first side 125 and a second side 126. The first side 125 and the second side 126 may be separated by a notch 127. A tip 28 may be attached to the first side 125 and the second side 126. The tip may be configured to hold the first side 125 and the second side 126 together, like the embodiment as shown within FIGS. 1-8, above. In certain embodiments, when the single-piece foundation pile 120 is installed into the ground, an expanding substrate 62 may be poured into a top 164 of the single-piece foundation pile 120. The top 164 may be fluidly coupled to a conduit that traverses a length of the foundation pile 120, allowing the expanding substrate to flow therethrough (e.g., by gravity, by force, by pumping, use of a plunger, etc.) and exit a distal end where the tip 28 is located. As the expanding substrate 62 cures it may expand, which pushes the first side 125 and the second side 126 apart, thereby forming a wedge shape and causing the tip 28 to detach. When the expanding substrate 62 cures, the first side 125 and the second side 126 are in an expanded state, forming a wedge such that an outer dimension of the screw cap 122 is greater than an outer dimension of the single-piece foundation pile 120.

Referring to FIG. 12, a uniformly shaped foundation pile 220 according to yet another embodiment of the present disclosure is shown. The uniformly shaped foundation pile 220 may operate similarly to the foundation pile 22 and the single-piece foundation pile 120, as described above. The uniformly shaped foundation pile 220 may include a uniformly shaped screw cap 222 attached at a bottom of the uniformly shaped foundation pile 220. The uniformly shaped screw cap 222 may include a top section 123 and a threaded section 124.

In certain embodiments, the threaded section 124 may be defined by a first side 125 and a second side 126. A tip 28 may be attached to the first side 125 and the second side 126. The tip may be configured to hold the first side 125 and the second side 126 together, like the embodiment as shown within FIGS. 1-8, above. In certain embodiments, when the uniformly shaped foundation pile 220 is installed into the ground, an expanding substrate 62 may be poured into a top 164 of the single-piece foundation pile 120. Again, the top 164 may be fluidly coupled to a conduit that traverses a length of the foundation pile 120, allowing the expanding substrate to flow therethrough (e.g., by gravity, by force, by pumping, use of a plunger, etc.) and exit a distal end where the tip 28 is located. As the expanding substrate 62 cures it may expand, which pushes the first side 125 and the second side 126 apart, thereby forming a wedge shape and causing the tip 28 to detach. When the expanding substrate 62 cures, the first side 125 and the second side 126 may in an expanded state, forming a wedge such that an outer dimension of the screw cap 122 is greater than an outer dimension of the single-piece foundation pile 120, such as shown in relation to the foundation pile 22 and the single-piece foundation pile 120, described above.

Another embodiment of a foundation system 20 for supporting a structure, such as a racking system, is shown in FIGS. 13-18. The foundation system 20 may include a racking post 32, a main post 322, and a barb assembly 21. The main post 322 may be similar to the foundation pile 22, such as described above. The main post 322 may include an upper section 35, a lower section 34, and one or more attachment holes 55 located at the upper section 35 of the main post 322. An attachment ring 30, may be configured to be disposed around the upper section 35 of the main post 322 to form a telescoping connection with the main post 322 and the racking post 32. The attachment ring 30 may further include the opening 41 for receiving the racking post 32. The attachment ring 30 may further include a plurality of nuts 66, such as described above for threadably receiving a set screw 33. The lower section 34 of the main post 322 may further include a plurality of through holes 316 for securing the barb assembly 21 within the main post using one or more nuts 317 secured to a threaded outer bar bolt 314.

The barb assembly 21 may include a first outer barb 302, a second outer barb 304, a split tube 310, and a cap 320. The first outer barb 302 and the second outer barb 304 may each include a plurality of threads 50. In certain embodiments, such as described above, the plurality of threads 50 may be formed at an angle between about 45° and about 90°. In certain embodiments, the plurality of threads 50 may be formed at an angle between about 35° and about 90°. The plurality of threads 50 may be configured to facilitate penetration of the barb assembly 21 when the main post 322 is being driven into the ground.

Figure 14A:
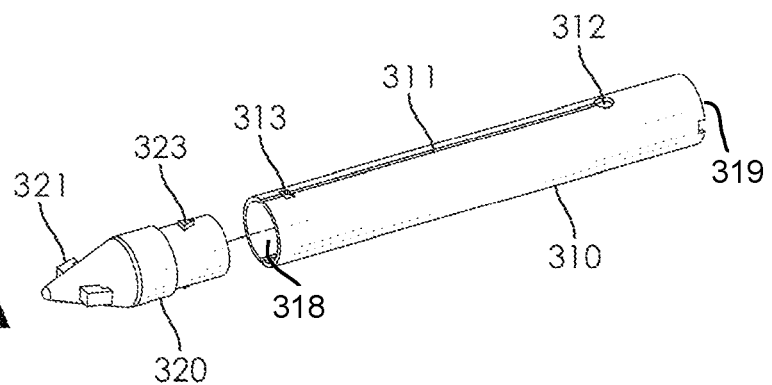
FIG. 14A is an exploded top perspective view of split tube and a cap of the foundation system of FIG. 13.
Figure 14B:
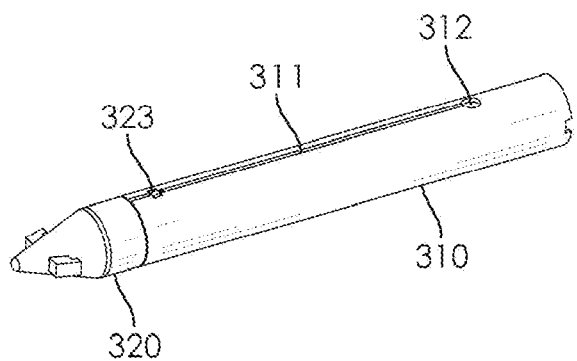
FIG. 14B is a top perspective view of the split tube and the cap attached thereto, according to the present disclosure.

FIGS. 14A-17E show a process of assembling another embodiment of a foundation system 20. As shown in FIG. 14A, the split tube 310 may include a split tube first end 318, a split tube second end 319, a split tube notch 311, a split tube hinge point 312, and a split tube detent hole 313. In certain embodiments, the split tube notch 311 may enable the split tube 310 to move from an unexpanded state to an expanded state, such as shown in FIG. 18. The movement to the expanded state may further be facilitated by the split tube hinge point 312.

Figure 15A:
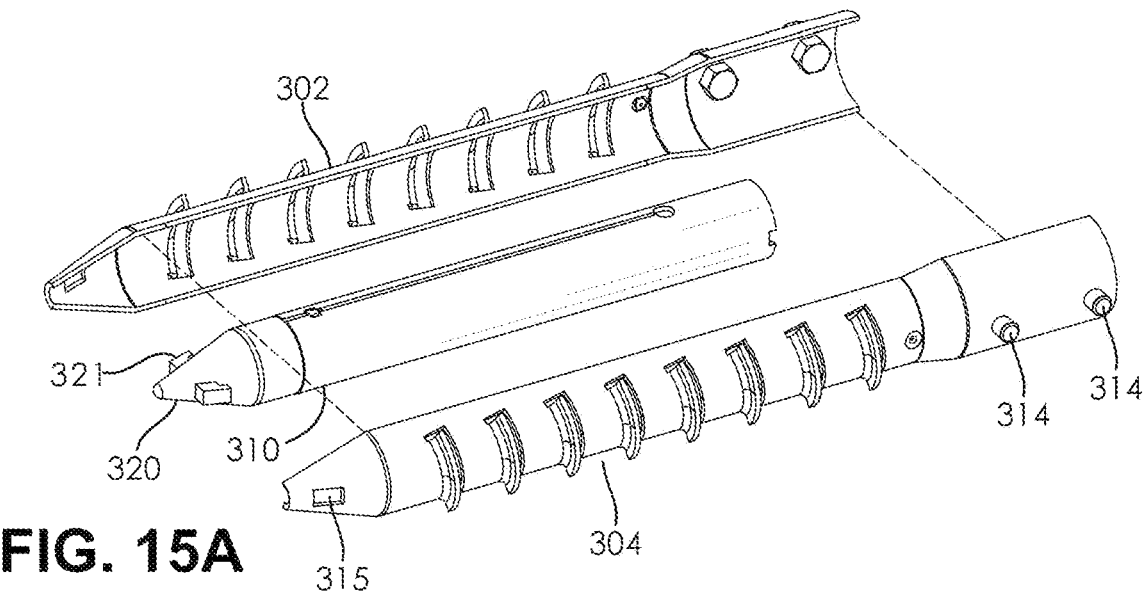
FIG. 15A is an exploded top perspective view of a barb assembly of a foundation system, according to the present disclosure.
Figure 15B:
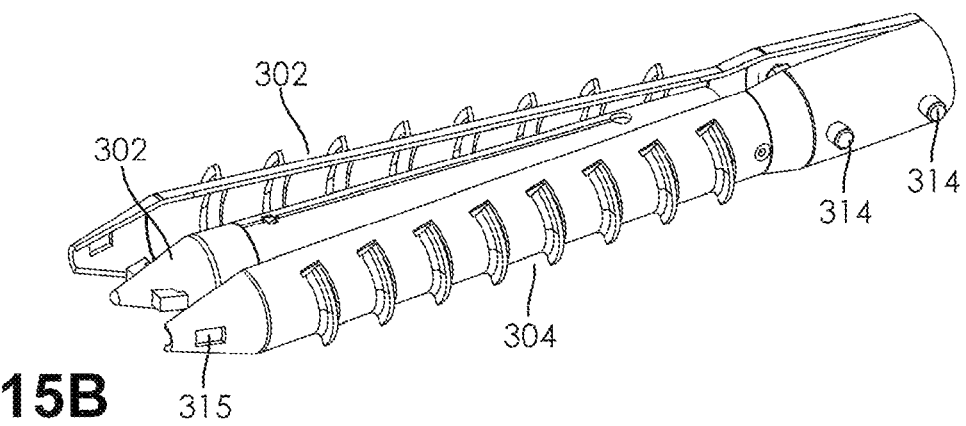
FIG. 15B is a partially disassembled top perspective view of a barb assembly of a foundation system showing a first barb and a second barb partially attached to a split tube and cap, according to the present disclosure.
Figure 16A:
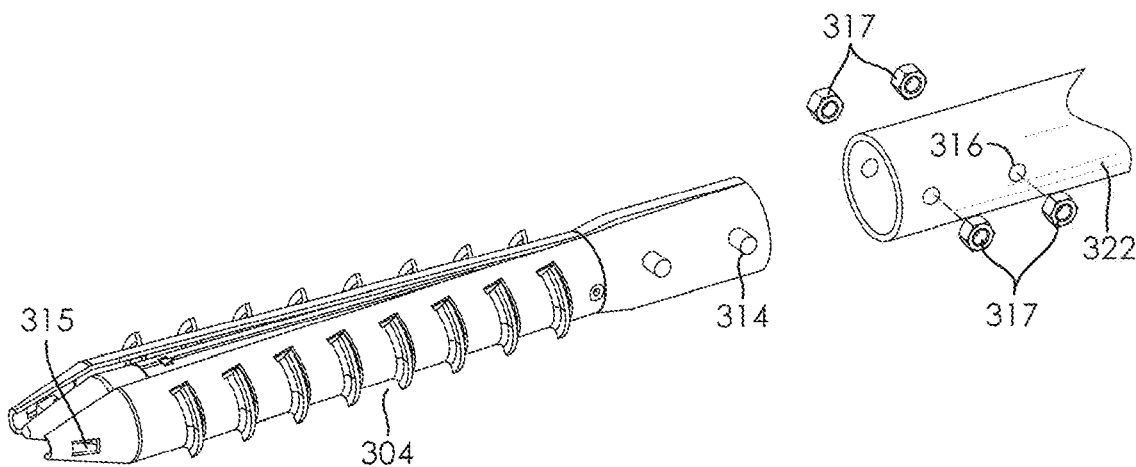
FIG. 16A is a partially exploded top perspective view of a barb assembly of a foundation system showing a first barb and a second barb partially attached to a split tube and cap with a partial exploded view of a main post and its components, according to the present disclosure.
Figure 16B:
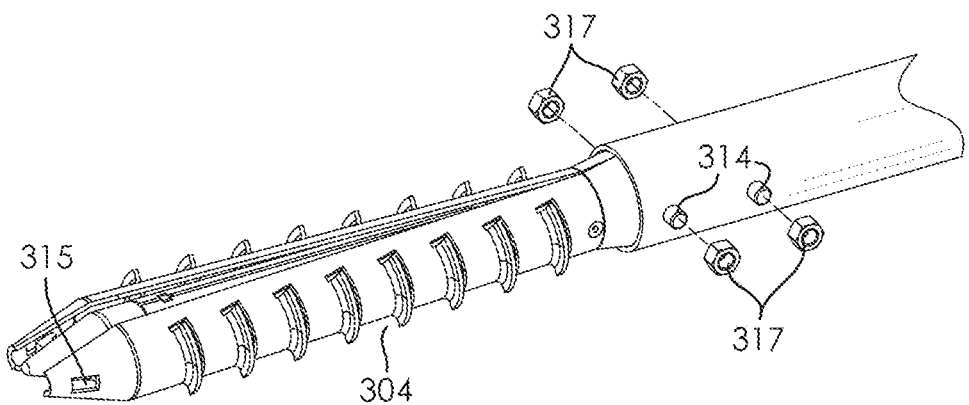
FIG. 16B is a top perspective view of a barb assembly of a foundation system showing a first barb and a second barb partially attached to a split tube and attached to the main post, according to the present disclosure.
Figure 16C:
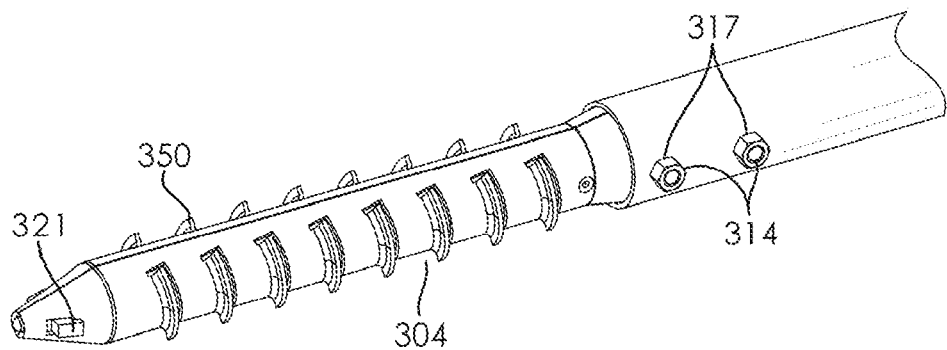
FIG. 16C is a top perspective view of an assembled barb assembly of a foundation attached to the main post, according to the present disclosure.

The cap 320 may include a cap detent 323 and one or more cap clips 321. The cap 320 may be inserted into the split tube 310 where the cap 320 is retained by the cap detent 323 secured within the split tube detent hole 313. As shown in FIGS. 15A and 15B, with the cap 320 inserted into the split tube 310, the first outer barb 302 and the second outer barb 304 may loosely close over the cap 320 and the split tube 310. As shown in FIGS. 16A-16C, with the first outer barb 302 and the second outer barb 304 loosely closed over the cap 320 and the split tube 310, the barb assembly 21 may be inserted into the main post 322. The barb assembly 21 may be locked into position within main post 322 with a cap clip 321 securely fit within a cap clip hole 315 of one or both of a first outer barb 302 and a second outer barb 304 and a nut 317 secured onto a threaded outer bar bolt 314. FIG. 16C shows the barb assembly 21 in the unexpanded state.

Figure 17A:
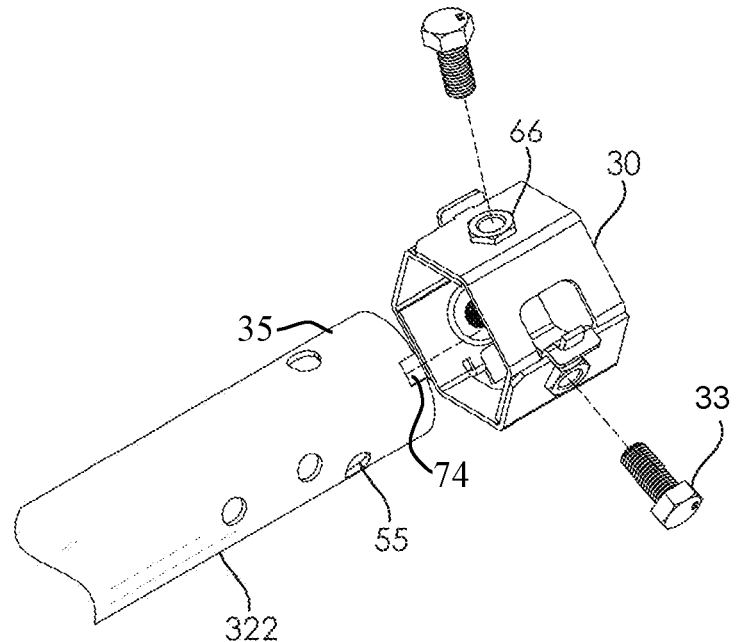
FIGS. 17A-17E show various stages of using an attachment ring to connect a racking post to an attachment post of the foundation system, according to the present disclosure.
Figure 17B:
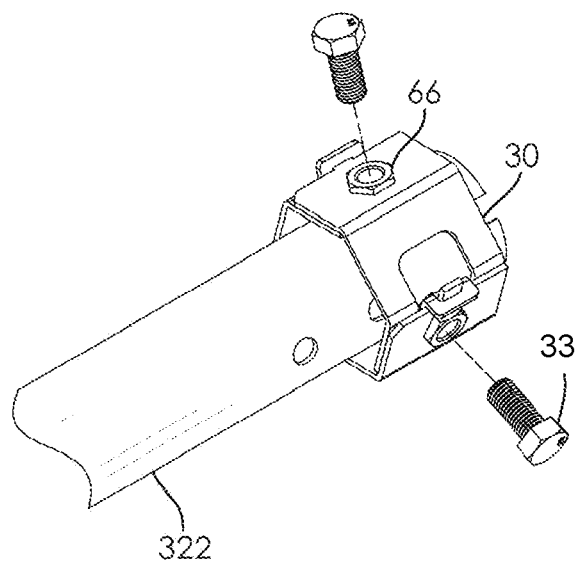
Figure 17C:
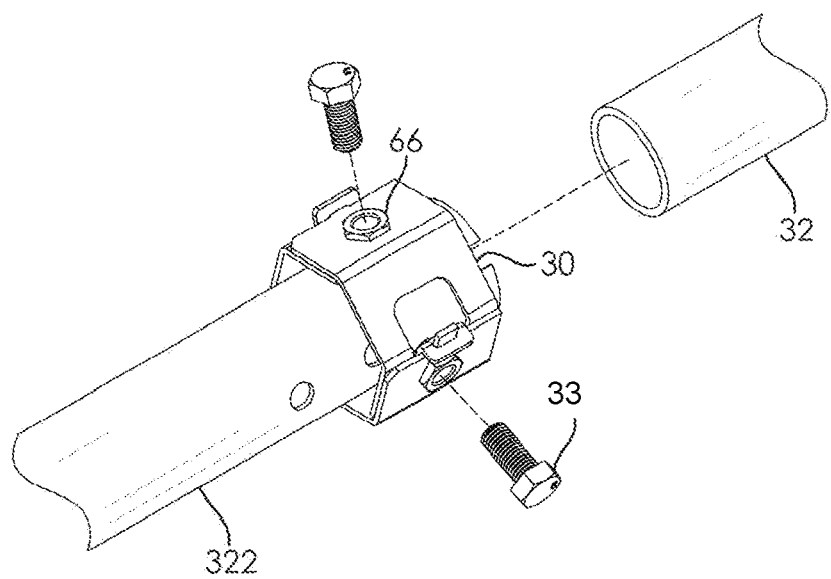
Figure 17D:
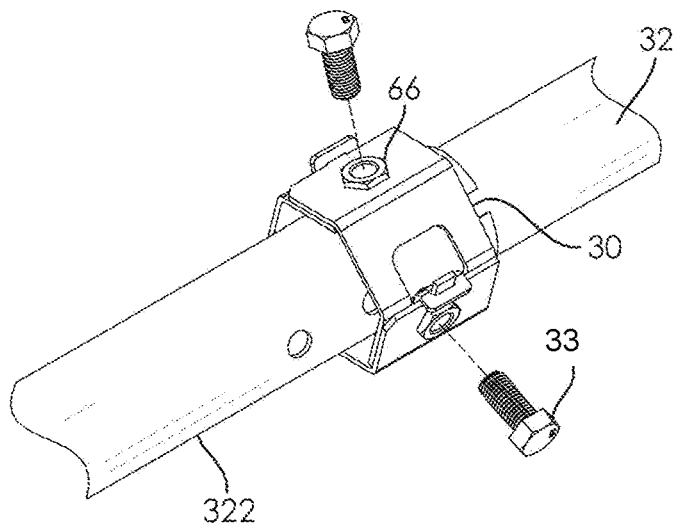
Figure 17E:
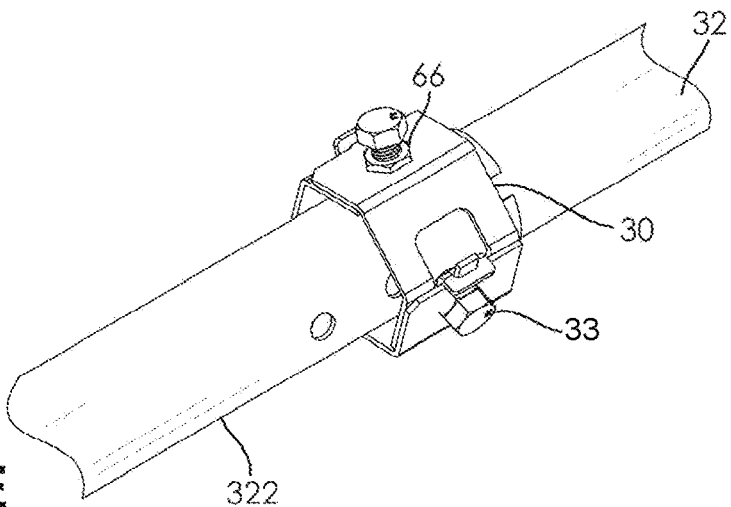

As shown in FIGS. 17A and 17B the attachment ring 30 may be used to secure the racking post 32 to the upper section 35 of the main post 322. The attachment ring 30 may be the same attachment ring as shown in FIG. 9, above. The attachment ring 30 may be slid onto the main post 322 until a nut 66 may align with an attachment hole 55 of the main post 322. As shown in FIGS. 17C-17E, the racking post 32 may be inserted into the main post 322, to a desired height of the foundation system 20 and the set screw 33 may be tightened into the attachment hole 55 to secure the main post 322 to the racking post 32.

FIGS. 18 and 19 shows the foundation system 20 in an expanded state, such as described in FIGS. 8A-8D, above. FIG. 19 shows the main post 322 installed within the ground in an expanded state. Like FIGS. 8A-8D above, to install the foundation system 20 within the ground, a hole 56 may be drilled at a predetermined depth into a ground 58 where the foundation system 20 is to be installed. The hole 56 may generally define a diameter that is smaller than the diameter of the main post 322 being installed. The hole 56 may allow for low installation torque. A predetermined amount of aggregate 60 may be placed into the hole 56. The aggregate 60 may include any material suitable for providing increased pile strength. For example, the aggregate 60 may include one or more of sand, gravel, crushed stone, slag, recycled concrete, and geosynthetic materials, among others. In certain embodiments, the aggregate 60 may include pea gravel that is placed in the bottom of the hole 56. In certain embodiments, the foundation system 20 may be installed by hand or with a machine operated rotator having an adaptor (not shown) attached to the main post 322 through the attachment holes 55 located at the upper section 35 of the main post 322.

The foundation system 20 may be installed in the hole 56 with low torque. The plurality of threads 50 on the first outer barb 302 and the second outer barb 304 may facilitate penetration of the main post 322 into the hole 56. A pointed shape of the cap 320 may facilitate grinding through the aggregate 60 and further inhibit the aggregate 60 from entering a bottom of the foundation pile 22. When the main post 322 is installed at a predetermined depth, a predetermined amount of an expanding substrate 62 may be poured into a hole 64 formed at the top of the main post 322. The expanding substrate 62 may include materials, such as concrete, mortar, a polymeric material, expanding foam. In particular, the expanding substrate 62 may include any appropriately desired expanding substrate 62, as known in the art. In certain embodiments, the type of expanding substrate 62 employed may be influenced by the structure being supported by the foundation system 20. For example, in certain embodiments, the expanding substrate 62 may include one or more of a concrete with a compressive strength of 20,000 psi, a polymeric material with a compressive strength between 6 and 8 psi, and an expanding foam with a compressive strength between 15 and 25 psi, as desired As shown FIG. 19, the barb assembly 21 has moved to an expanded state (E). As described above, in certain embodiments, as the expanding substrate 62, which has been inserted into the racking post 32 cures, it expands, pushing the first outer barb 302 and the second outer barb 304 in a direction away from each other, thereby forming a wedge shape with the expanding substrate 62 in a middle of the first outer barb 302, the second outer barb 304, and an expanded split tube 310. As the substrate 62 cures, the first outer barb 302 and the second outer barb 304 this causes the cap 320 to detach. When the first outer barb 302 and the second outer barb 304 are in the expanded state, an outer dimension of the barb assembly 21 is greater than an outer dimension of the main post 322, and thereby forms a wedge shape. The wedge shape may strengthen the structural integrity of the foundation system 20 and may absorb greater compressive and tensile forces.

When the foundation pile 22 is installed into the ground, an attachment ring 30, such as shown in FIG. 9 and FIGS. 17A-17E for securing the racking post 32 to the main post 322 may be attached to the upper section 35 of the main post 322.

Figure 20:
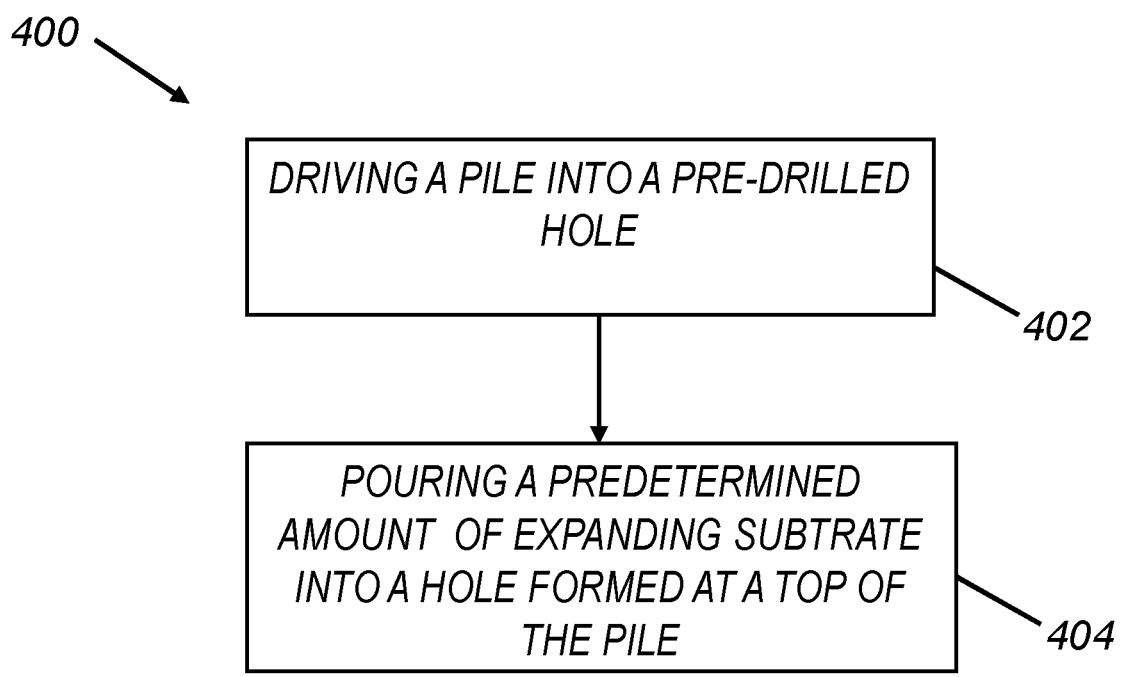
FIG. 20 shows a flowchart of a method of installing a pile for supporting a structure, according to the present disclosure.

FIG. 20 shows a method 400 of installing a pile for supporting a structure. In step 402, the method 400 may include, driving a pile into a pre-drilled hole 50. The pile may include an upper section 35 and a lower section 34. In step 404, a predetermined amount of expanding substrate 62 may be poured into a hole 64 in a top of the pile. In certain embodiments, as the expanding substrate 62 cures, the lower section 34 moves from an unexpanded state to an expanded state thereby forming a wedge shape at the lower section 34. The method may further include placing a predetermined amount of aggregate 60 into the hole 50 before driving the pile into the hole 50. An attachment ring 30 may be attached to an upper section 35 of the pile. In certain embodiments, a racking post 32 may be inserted into the pile and set to a predetermined height. The racking post 32 may be secured within the pile at the predetermined height.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions, and methods can be made within the scope of the present technology, with substantially similar results.

What is claimed is:

1. A foundation system for supporting a structure, comprising:
   a main post including an upper section and a lower section below the upper section;
   a racking post telescopically connected to the upper section of the main post; and
   a barb assembly connected to the lower section of the main post, the barb assembly including a first outer barb, a second outer barb, a split tube, and a cap, where the split tube is configured to receive the cap at a first end of the split tube, where the barb assembly is configured to move from an unexpanded state to an expanded state, thereby forming a wedge shape at the lower section of the main post.

2. The foundation system for supporting a structure of claim 1, wherein the cap is retained by a cap detent secured within a detent hole of the split tube.

3. The foundation system for supporting a structure of claim 2, wherein the first outer barb and the second outer barb cover the cap and the split tube in an assembled configuration of the barb assembly.

4. The foundation system for supporting a structure of claim 3, wherein the first outer barb and the second outer barb are secured over the cap and the split tube with a cap clip fit within a cap clip hole of one or both of the first outer barb and the second outer barb.

5. The foundation system for supporting a structure of claim 4, wherein the barb assembly is connected to the lower section of the main post using one or more fasteners secured to one or both of the first outer barb and the second outer barb.

6. The foundation system for supporting a structure of claim 1, wherein the split tube includes a split tube notch and a split tube hinge point for facilitating movement of the barb assembly from the unexpanded state to the expanded state.

7. The foundation system for supporting a structure of claim 1, wherein the cap is configured to detach from the split tube when the barb assembly moves from the unexpanded state to the expanded state.

8. The foundation system for supporting a structure of claim 1, wherein each of the first outer barb and the second outer barb includes a plurality of threads.

9. The foundation system for supporting a structure of claim 1, wherein the main post includes a hole configured to accept an expanding substrate, where the hole is configured as a conduit that allows the substrate to flow through the main post to the barb assembly to move the barb assembly to the expanded state as the expanding substrate cures.

10. A foundation system for supporting a structure, comprising:

a main post including an upper section and a lower section below the upper section;

a racking post telescopically connected to the upper section of the main post;

an attachment ring for securing the racking post to the upper section of the main post, the attachment ring includes a top end, a bottom end, and a fastener having a center aperture configured to align with a hole of the upper section of the main post; and a barb assembly connected to the lower section of the main post, where the barb assembly is configured to move from an unexpanded state to an expanded state, thereby forming a wedge shape at the lower section of the main post.

11. The foundation system for supporting a structure of claim 10, where in the attachment ring further includes a clocking feature configured to rotationally align a through hole of the attachment ring with a through hole of the main post.

12. The foundation for supporting a structure of claim 11, wherein the clocking feature includes a notch, wherein the notch includes an inwardly extending protrusion having a lower face and one or more sidewalls.

13. The foundation for supporting a structure of claim 12, wherein the main post includes a recess, wherein the recess is configured to receive the notch of the attachment ring.

* * * * *